Figure 2:
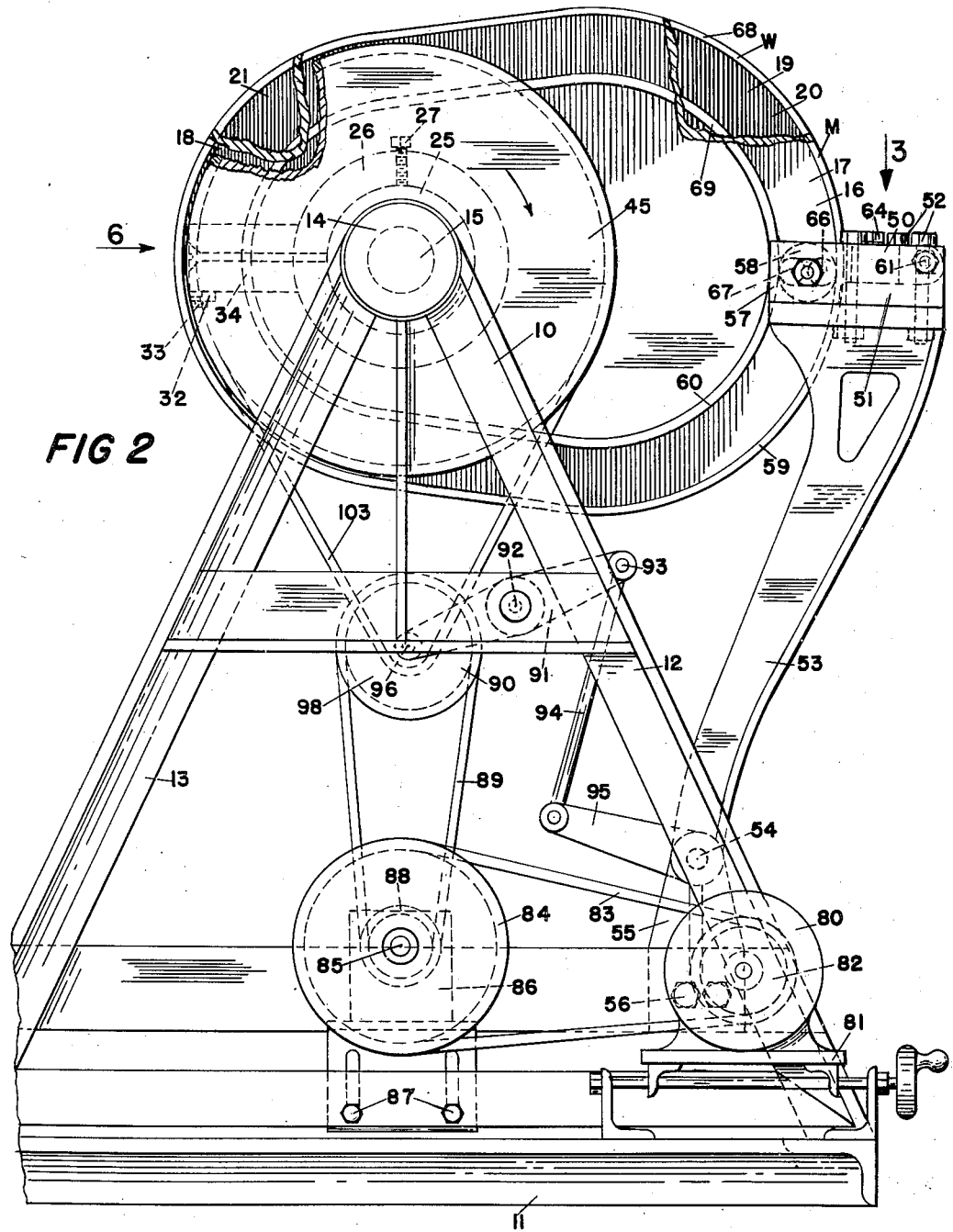

Dec. 13, 1949 W. Y. ROBB 2,491,134
MACHINE FOR FLAME TEMPERING CAMS
Filed May 21, 1946 3 Sheets-Sheet 1
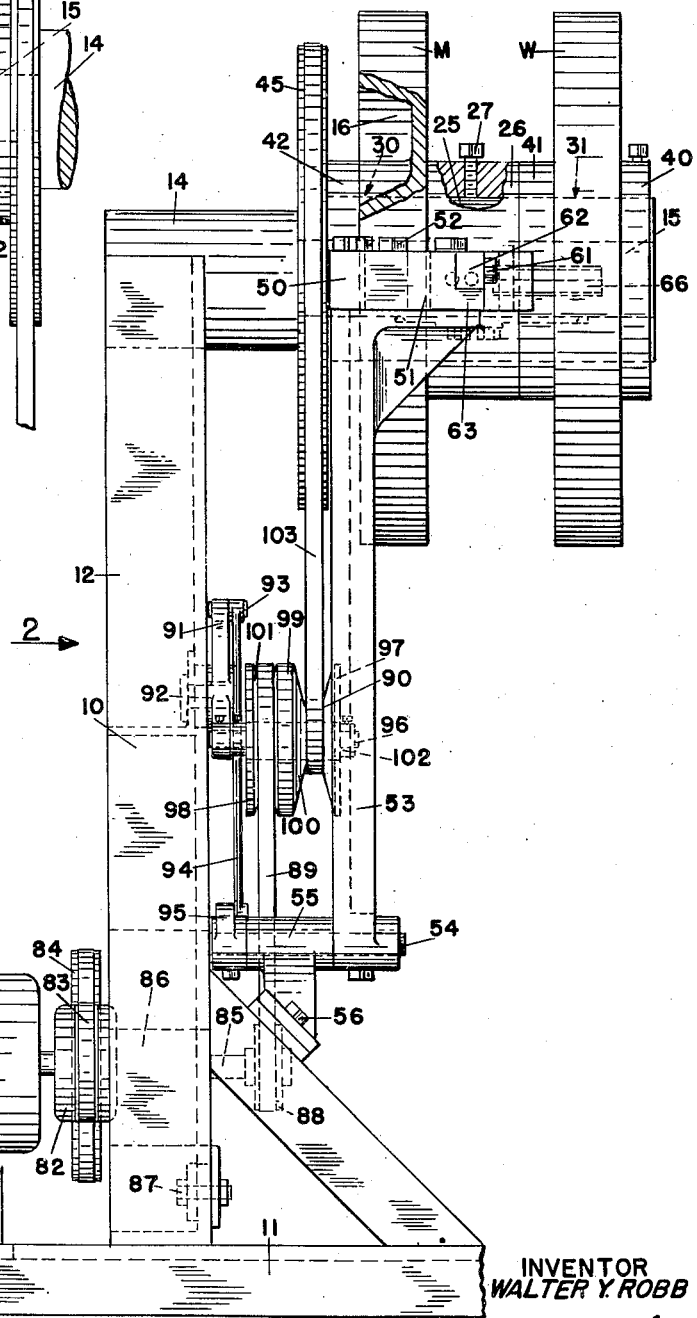
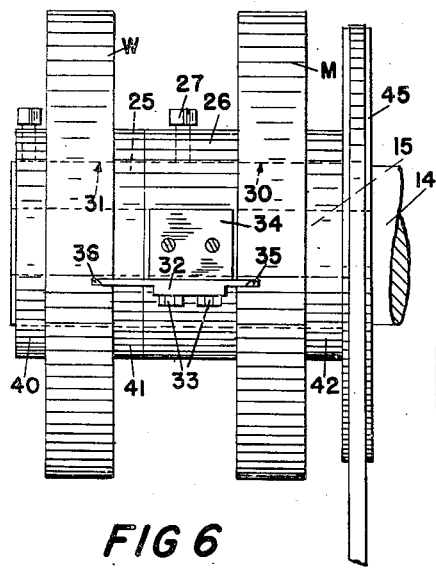
INVENTOR
WALTER Y. ROBB
ATTORNEY Dec. 13, 1949  W. Y. ROBB  2,491,134
MACHINE FOR FLAME TEMPERING CAMS
Filed May 21, 1946  3 Sheets-Sheet 2

INVENTOR
WALTER Y. ROBB
Chas. T. Hawley
ATTORNEY

Dec. 13, 1949 W. Y. ROBB 2,491,134
MACHINE FOR FLAME TEMPERING CAMS
Filed May 21, 1946 3 Sheets-Sheet 3

INVENTOR
WALTER Y. ROBB
Chas. T. Hawley
ATTORNEY

Patented Dec. 13, 1949

2,491,134

UNITED STATES PATENT OFFICE 2,491,134

MACHINE FOR FLAME TEMPERING CAMS

Walter Y. Robb, Whitinsville, Mass., assignor to Crompton & Knowles Loom Works, Worcester, Mass., a corporation of Massachusetts Application May 21, 1946, Serial No. 671,325

6 Claims. (Cl. 266—4)

This invention relates to improvements in apparatus for tempering cams, gears, and the like, and it is the general object of the invention to provide a simple mechanism by which a tempering unit can be guided along a path corresponding to the contour to be heat treated.

Many cams and gears, such for instance as those used in the manufacture of looms, are made of cast iron and ordinarily wear out at such a fast rate as to require frequent renewal. It is possible to harden certain alloys of cast iron by subjecting them first to the action of a flame and then immediately quenching to chill the heated parts. The heating should be no more than just sufficient to provide the desired degree of hardness, and one method of effecting this result is to move the surfaces to be hardened relatively to a heating and quenching head or unit.

It is an important object of my invention to provide means by which the work to be tempered is moved with respect to a tempering head and the latter is controlled in such manner as to harden certain desired parts of the work. This latter result may be accomplished by the use of a master similar to the work piece and operative to cause movement of the tempering head along a path similar to a path on the master.

Some cams vary considerably with respect to the radial distance of their several parts from the cam axis, part of the contour being relatively close to the axis and other parts being farther from the axis. It is desirable that the rate of heating be uniform along the contour of such a cam, but this is not possible if the cam turns at a uniform speed, since the parts of small radius would be overheated while the parts of large radius would be under heated. Accordingly, it is another object of my invention to provide means for varying the angular rate at which the work cam is moved in inverse proportion to the radius of the part being tempered. Thus, the work cam turns at a relatively high angular rate when a contour of small radius is being heated, but turns at a slow angular rate when a contour of large radius is being heated. In this way a uniform linear travel of the part being heated is obtained with respect to the tempering head.

It is a further object of my invention to provide a support for the master and work parts so constructed as to permit quick application of the work cam to the machine while at the same time insuring its registry with the master cam. It is still another object of the invention to mount the tempering head for ready removal from the path of the master cam when the latter is to be removed.

With these and other objects in view which will appear as the description proceeds, my invention resides in the combination and arrangement of parts hereinafter described and set forth.

Figure 3:
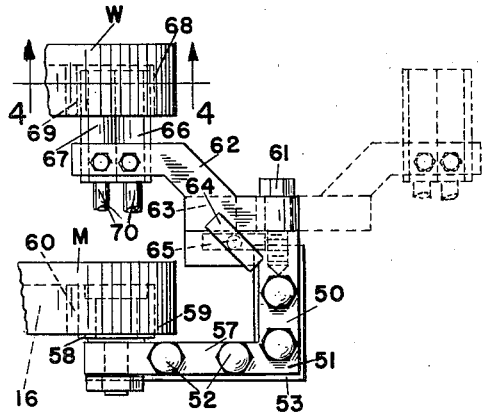
Figure 4:
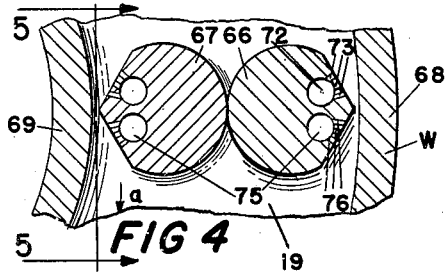
Figure 5:
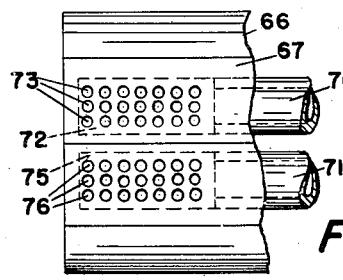
Figure 7:
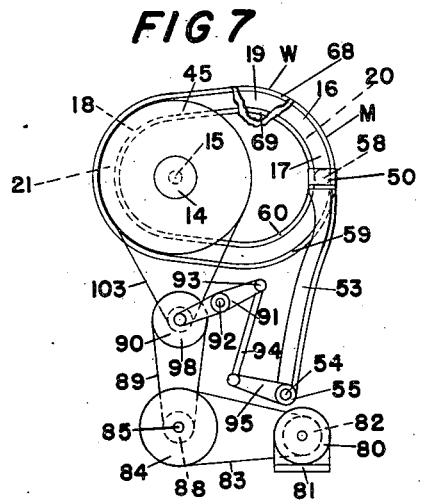
Figure 8:
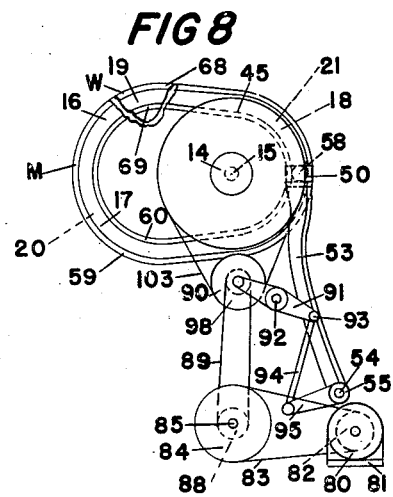

In the accompanying drawings, wherein a convenient embodiment of my invention is set forth, Fig. 1 is a front elevation of a tempering machine made according to my present invention, Fig. 2 is a side elevation looking in the direction of arrow 2, Fig. 1, Fig. 3 is a plan view looking in the direction of arrow 3, Fig. 2, parts being omitted, Fig. 4 is an enlarged transverse section on line 4—4 of Fig. 3, Fig. 5 is an enlarged side elevation, parts removed, of one of the tempering heads, Fig. 6 is a rear elevation looking in the direction of arrow 6, Fig. 2, and Figs. 7 and 8 are diagrammatic views showing the tempering head in position for tempering contours of large and small radii, respectively.

The invention is usable for the flame hardening of a variety of different mechanical elements, but in order to illustrate the invention I have shown the same as adapted for the tempering of a track or groove cam. Referring particularly to Figs. 1 and 2, the apparatus or machine comprises a frame 10 having a base 11 and side members 12 and 13 which preferably converge upwardly toward each other and support a member 14 from which extends a fixed horizontal stud 15. The machine operates with a master cam M and a work cam W. These cams are similar and in the present instance are provided with non-circular contours. The master has a guide track or groove 16 one part 17 of which is of relatively large radius and another part 18 of which has a relatively short radius. In similar manner the work cam has a work track or groove 19 similar to groove 16 and has a contour the parts 20 and 21 of which, respectively, have large and small radii corresponding to the parts 17 and 18 of the master cam.

Mounted for rotation on stud 15 is a sleeve 25 on which cams M and W are mounted. A collar 26 between the cams is mounted on the sleeve and fixed thereto by means of a set screw 27. Sleeve 25 fits the bores 30 and 31, respectively, of cams M and W, and maintains the latter concentric with the axis of stud 15. A positioning bar 32 shown more particularly in Fig. 6 is secured as at 33 to a lug 34 on collar 26 and projects laterally on each side of the lug.

The master cam has a groove 35 receiving the right end of the positioning bar 32 as viewed in Fig. 6, and in similar manner the working cam has a groove 36 which receives the left end of bar 32. These two grooves occupy the same position with respect to the contours of their respective cams, and since the bar 32 is straight and parallel to stud 15, the two cams are held in register on the sleeve 25. The bar 32 causes rotation of the two cams at the same angular rate as the sleeve rotates. A collar 40 is secured to the outer or free end of stud 15 to hold sleeve 25 on the stud. Other collars 41 and 42 are loose on the sleeve. A driving pulley 45 is integral with sleeve 25 and is held by collar 40 against the member 14.

The structure just described is shown more particularly in Fig. 6 and the upper part of Fig. 1, and when the parts are as shown with the set screw 27 tight, the pulley 45, sleeve 25, registering bar 32, and both the master and work cams turn in unison about the axis of stud 15 with the cam contours in register.

The flame tempering part of the apparatus and the controller therefor, shown more particularly in Figs. 2 and 3, comprises a unit designated herein generally at 50. This unit includes a support 51 secured as at 52 to the upper end of a lever 53. The latter is secured at its lower end to a shaft 54 rockable in a bearing 55 secured as at 56 to the frame of the machine. The support 51 has a lateral arm 57 on which is rotatably mounted a roll or cam follower 58 for entry into the groove 16 of the master cam M. This groove is defined by outer and inner guide flanges 59 and 60, respectively, which position the follower 58.

As shown more particularly in Fig. 3, the support 51 is provided with a pivot screw 61 the axis of which is substantially parallel to the axis of stud 15, although this latter relation is not essential. Pivoted on the screw 61 is a carrier 62 which normally rests on a support shelf 63 formed as part of the support 51. In order to hold the carrier 62 in normal position on the shelf I provide a lock 64 pivoted as at 65 to the support 51. When the lock is in the full line position shown in Fig. 3 it holds the carrier in normal position against the shelf 63. When it is desired to swing the carirer 62 out of the path of the master gear M when the latter is being removed from the machine the lock 64 is moved to the dotted line position in Fig. 3, after which the carrier is swung to the right about the pivot screw 61 or to the dotted line position shown in Fig. 3.

The carrier in the present instance supports two heating and quenching heads 66 and 67, the first head for the outer work flange 68 of the work cam corresponding to the work flange 59 of the master cam, and the other head for the inner flange 69 of the work cam. These heads are alike except that they face in opposite directions and as shown more particularly in Fig. 5 each head is supplied with a gas mixture by means of conduit 70 and with water by means of a conduit 71. The gas conduit communicates with a chamber 72 the walls of which are perforated as at 73, and in similar manner the water pipe communicates with a chamber 75 the walls of which are perforated as at 76.

When the carrier 62 is in its normal position the two heads 66 and 67 are located in substantial register or alignment with the follower 58 and are spaced slightly from their respective cam flanges, as indicated in Fig. 4. It will be apparent from Fig. 3 that movement of the support 51 by a force derived from the master cam and communicated through the follower 58 will be transmitted to the tempering heads and the latter will follow the contour of the work cam as roll 58 is moved toward and from the stud 15 due to rotation of the master cam.

Power for turning the cams is derived from an electric motor 80 mounted on a support 81 and provided with a small pulley 82 which drives a belt 83. The latter drives a relatively large pulley 84 secured to a shaft 85 journaled in a bearing 86 fixed with respect to the frame 10 but preferably adjustable relatively thereto by the connections indicated generally at 87. A small pulley 88 on shaft 85 drives a belt 89 which leads to a variable speed mechanism designated generally at 90. This mechanism includes a lever 91 rockable on a stationary stud 92 and having one end thereof connected as at 93 to a depending rod 94. The latter is connected to an arm 95 secured to the shaft 54 and moving with lever 53.

That end of lever 91 opposite the rod 94 has secured thereto a laterally extending stud 96 on which two end pulley flanges 97 and 98 are rotatably mounted. Slidably mounted between these flanges is a pulley element 99 having beveled surfaces 100 corresponding to beveled surfaces 101 on the flanges 97 and 98. A collar 102 secured to the outer end of stud 96 limits motion of flange 97 to the right, Fig. 1, and lever 91 limits motion of flange 98 to the left.

Belt 89 engages the flange 98 and the left part of the element 99 as viewed in Fig. 1, while the right part of the element 99 and the other flange 97 engages a belt 103 which drives the pulley 45. The mechanism 90 operates in such manner that when it rises belt 89 tightens and causes lateral sliding of the pulley element 99 to the right as viewed in Fig. 1. Belt 89 then engages flange 98 and element 99 along a reduced circumference, while belt 103 engages element 99 and flange 97 along an increased circumference. The change in diameters of those parts of the element 99 engaged by the belts 89 and 103 causes a variation in the speed at which pulley 45 is driven.

In assembly, the sleeve 25 is fitted onto stud 15 and collar 42 is slipped over the free end of the sleeve and moved against the pulley 45, after which the master cam M is fitted to the sleeve in such manner that the roll follower 58 will enter the track 16. The collar 26 is then slipped over the free end of the sleeve and moved against the master cam with the advancing end of the registering bar 32 entering groove 35. Set screw 27 is then tightened, after which washer 41 is slipped over the sleeve, and then the work cam W is placed on the sleeve in such position that the other end of the registering bar 32 will enter groove 36. The washer 40 is then tightened on the outer end of the stud 15 and is so located as to establish a snug fit between all the parts on the sleeve 25. When thus assembled the registering bar 32 not only causes the contours of the master and work cams to be in register with each other, but also causes the cams to turn whenever sleeve 25 is rotated by the pulley 45. The cams turn in the direction of arrow a, Fig. 4, so that cam W moves downwardly toward the heating flame and then away from the quenching part of the tempering head.

The various pulleys are so proportioned and related to the speed of the motor that when the latter is running the cams will turn at such a rate as will permit correct heating of those parts of the flanges of the work cam as are opposite the tempering head. It will be apparent that the variable speed drive 90 will reduce the speed at which the cams are turning when the follower 58 is moved away from the axis of stud 15 and conversely will increase the speed when the follower moves toward the stud 15. In this way a uniform linear travel of the work cam relatively to the tempering head is established. In those instances in which the cams have contours which are almost circular there will be very little change in the rate of angular movement of the cams, but when there is a considerable variation in the distance of various parts of groove 16 from stud 15 the change in rate will be more marked.

The change in the position of the mechanism 90 is shown diagrammatically in Figs. 7 and 8 in the first of which it is assumed that the follower 58 engages a part of the contour 16 at a considerable distance from the stud 15. In Fig. 8, however, it is assumed that the follower 58 has been moved from the position of Fig. 7 toward the stud 15, thereby rocking lever 53 and raising mechanism 90 to turn the cams at a faster rate. The lever 91 may be considered a member which by the change in the position thereof effects a change in the rate of turning of the master and work cams.

From the foregoing it will be seen that I have provided simple means by which a work piece, such as a cam, can be flame tempered by mechanism which causes the tempering unit or head to follow the contour of the cam. In the present instance a rotary cam moves and the tempering head is fixed, but so far as certain features of my invention are concerned I do not wish to be limited to this arrangement. It will further be seen that the follower 58 is moved by the master cam and in turn causes the tempering head to have similar movements to follow the contour of the work cam. The registering bar 32 not only drives the cams but keeps them in the same angular position while rotating and enables the tempering head to operate correctly with respect to the flanges of the work cam. Furthermore, the connection between lever 53 and the variable speed drive mechanism 90 permits a variation in the angular rate of the cams the effect of which is to cause a uniform linear movement of the parts of the cam to be hardened with respect to the tempering unit. Also, the carrier 62 can be swung out of the path of the master cam when the latter is to be removed, and the work cams can be applied to the machine without disturbing the master cam or collar 26.

Having thus described my invention it will be seen that changes and modifications may be made therein by those skilled in the art without departing from the spirit and scope of the invention and I do not wish to be limited to the details herein disclosed, but what I claim is:

1. In a cam tempering machine having similar master and work cams and a supporting frame, the master cam being rotatable on the machine about an axis and having a given contour non-circular relatively to said axis and the work cam to be tempered also being rotatable on said machine about said axis and having the same contour as the master cam, means causing said master and work cams to have their contours in angular register with each other as said cams rotate, a support mounted on the frame for movement in a path all points of which are in the same angular position relatively to said axis, a follower on the support engaging the master cam and moved relatively to said axis due to rotation of said master cam and causing movement of the support relatively to said axis when the follower is thus moved by the master cam, a tempering head mounted on and moving with said support and aligned with the follower, gas and liquid conduits connected to said tempering head, and means causing rotation of said cams, the master cam when rotating causing movement of the support, tempering head and conduits in said path by a force transmitted through the follower and said tempering head registering with that part of the contour of the work cam corresponding to that part of the master cam in engagement with the follower.

2. In a cam tempering machine having a frame and similar master and work cams, the master cam being rotatable on said machine about an axis and having a contour parts of which are relatively near to said axis and other parts of which are relatively far from said axis and the work cam to be tempered having a contour similar to the contour of the master cam and also being rotatable on said machine about said axis, a support movably mounted on said frame relatively to said axis, a follower moving with the support and engaging the contour of the master cam and moving toward and from said axis as the master cam rotates, a tempering head for the work cam moving with the support, means causing said cams, follower and head to be so related that said head and follower are adjacent to corresponding parts of their respective cams, a driving motor for the tempering machine, a variable speed drive mechanism operatively inter-exposed between said motor and said cams including a movable member effective when the position thereof is changed to alter the rate of turning of said cams, and operative connections between said master cam and said member by which said master cam due to rotation thereof changes the position of said member to cause the cams to turn at a relatively fast rate when the follower engages said parts of the master cam contour relatively near to said axis and turn said cams at a relatively slow rate when said follower engages those parts of the master cam contour relatively far from said axis.

3. In a cam tempering machine having similar master and work cams, means mounting said cams for rotation in unison and along which said cams are slidable for removal from said mounting means, a support movably mounted on the machine, a follower on the support engaging the master cam, an arm mounted on said support for pivotal movement from the normal position thereof independently of said follower in a direction away from said mounting means, and a tempering unit on said arm, the latter when in normal position locating the tempering unit in substantial alignment with said follower and in the path of the master cam when the latter slides along said mounting means for removal therefrom, said arm when moved pivotally from the normal position thereof swinging out of said path of the master cam.

4. In a work cam tempering machine provided with a frame supporting a stud having an axis, the work cam being mounted for rotation about said axis and having on one side thereof a non-circular guide cam groove between work flanges, a master cam similar to said work cam located at the side of the latter adjacent to said work flanges and also being mounted for rotation about said axis and having a non-circular guide cam groove similar to said work cam groove located between guide flanges on the master cam facing away from said work cam, said cams turning in unison and aligned in a direction parallel to said axis, a support mounted on said frame for movement toward and from said axis, a follower on said support located in said guide groove and entering the latter from the side of the master cam opposite to said work cam and movable toward and from said axis as said master cam rotates, a tempering head between said master and work cams, a pivotal mounting on said support for said tempering head, means normally positioning said pivotal mounting to align said follower and head in a direction parallel to said axis, said master cam being removable by movement along said axis in a direction toward said tempering head and work cam, and said tempering head being movable about said pivotal mounting thereof to a position out of the path of the master cam when the latter is removed.

5. In a work cam tempering machine having a frame, the work cam rotating on the frame about an axis and having a non-circular work cam groove located between work flanges on said cam, a master cam similar to said work cam rotating about said axis in unison with the work cam and in alignment with the latter in a direction parallel to said axis and having a non-circular guide cam groove between two guide flanges on said master cam, a support movably mounted with respect to said frame in a direction toward and from and transversely of said axis, a follower on said support located between said guide flanges moving toward and from and transversely of said axis as said master cam rotates, and a tempering head on said support aligned with the follower in a direction parallel to said axis and located in said work cam groove and effective to temper both of said work flanges simultaneously as said cams rotate.

6. In a work cam tempering machine having a frame, the work cam rotating on the frame about an axis and having a non-circular work cam groove located between work flanges on said cam, a master cam similar to said work cam rotating about said axis in unison with the work cam and in alignment with the latter in a direction parallel to said axis and having a non-circular guide cam groove between two guide flanges on the master cam, a support movably mounted with respect to said frame in a direction toward and from and transversely of said axis, a follower on said support located between said guide flanges moving toward and from and transversely of said axis as the master cam rotates, and a pair of tempering heads mounted on said support and located in said work cam groove between said work flanges, one head for each work flange, said tempering heads being effective to temper both of said work flanges simultaneously as said cams rotate.

WALTER Y. ROBB.

REFERENCES CITED

The following references are of record in the file of this patent:

UNITED STATES PATENTS

| Number | Name | Date |
|---|---|---|
| 1,599,611 | Dover | Sept. 14, 1926 |
| 1,711,633 | Dornseif | May 7, 1929 |
| 2,116,262 | Grandberg et al. | May 3, 1938 |
| 2,170,876 | Shorter | Aug. 29, 1939 |
| 2,429,559 | Matson | Oct. 21, 1947 |

FOREIGN PATENTS

| Number | Country | Date |
|---|---|---|
| 176,750 | Great Britain | Sept. 7, 1922 |